United States Patent [19]
Peters, Jr.

[11] Patent Number: 6,098,923
[45] Date of Patent: Aug. 8, 2000

[54] AIRCRAFT STRUCTURE TO IMPROVE DIRECTIONAL STABILITY

[75] Inventor: Spence E. Peters, Jr., Fort Worth, Tex.

[73] Assignee: Lockheed Martin Corporation, Bethesda, Md.

[21] Appl. No.: 09/042,278

[22] Filed: Mar. 13, 1998

[51] Int. Cl.[7] .................................................. B64C 3/00
[52] U.S. Cl. ...................... 244/45 R; 244/13; 244/35 R
[58] Field of Search .................... 244/13, 35 R, 244/45 R, 91, 46, 47, 38, 37

[56] References Cited

U.S. PATENT DOCUMENTS

| | | |
|---|---|---|
| D. 130,649 | 12/1941 | Silverstein . |
| D. 185,546 | 6/1959 | Geraci . |
| 1,939,682 | 12/1933 | Fleming . |
| 2,147,968 | 2/1939 | Delanne . |
| 3,834,654 | 9/1974 | Miranda . |
| 3,942,747 | 3/1976 | Wolkovitch . |
| 3,981,460 | 9/1976 | Ratony . |
| 3,985,317 | 10/1976 | Geraci et al. . |
| 4,053,125 | 10/1977 | Ratony . |
| 4,090,681 | 5/1978 | Zimmer . |
| 4,146,199 | 3/1979 | Wenzel . |
| 4,336,913 | 6/1982 | Hall . |
| 4,365,773 | 12/1982 | Wolkovitch . |
| 4,541,593 | 9/1985 | Cabrol . |
| 4,856,736 | 8/1989 | Adkins et al. . |
| 4,881,701 | 11/1989 | Bullard . |
| 4,899,954 | 2/1990 | Pruszenski, Jr. . |
| 5,046,684 | 9/1991 | Wolkovitch . |
| 5,503,352 | 4/1996 | Eger . |
| 5,899,409 | 5/1999 | Frediani . |

FOREIGN PATENT DOCUMENTS

| | | |
|---|---|---|
| 3710703 | 10/1988 | Germany . |
| 88/06551 | 7/1988 | WIPO . |

*Primary Examiner*—Peter M. Poon
*Assistant Examiner*—Tien Dinh
*Attorney, Agent, or Firm*—Felsman, Bradley, Vaden, Gunter & Dillon, L.L.P.; James E. Bradley

[57] ABSTRACT

An aircraft structure has an arrangement of aircraft components that provide inherent directional stability for a flight vehicle throughout an angle-of-attack range, even at very high angles-of-attack where conventional means of stabilization are ineffective. Components attached to an aircraft fuselage include a wing, horizontal stabilizers and vertical stabilizers. The wing is mounted forward of the horizontal stabilizers and is carried high on the fuselage. The horizontal stabilizer is mounted toward the rear of the aircraft and is attached near the bottom of the fuselage. The wing and horizontal stabilizers are joined on either side of the aircraft by forwardly sweeping aerodynamically shaped surfaces serving as the vertical stabilizers. The inclination of the vertical stabilizers preferably ranges from 45 degrees (top edge canted outboard) to 90 degrees (panels vertical). Preferably, the surface area of the vertical stabilizers is concentrated aft such that the aerodynamic center of the vertical stabilizers is located behind the center-of-gravity of the aircraft.

22 Claims, 2 Drawing Sheets

AIRCRAFT STRUCTURE TO IMPROVE DIRECTIONAL STABILITY

TECHNICAL FIELD

This invention relates generally to aircraft and more particularly to a particular arrangement of components in aircraft design for providing increased directional stability at high angles of attack, a means to reduce the overall drag of the aircraft, and the capability to build an aircraft structure having a greater stiffness for a given aircraft weight.

BACKGROUND ART

Many types of aircraft are required to be highly maneuverable to perform their functions. Examples include aerobatic light aircraft, trainers, and fighter or attack aircraft. Such aircraft are occasionally required to operate in flight regions where the angle-of-attack is large. Angle-of-attack refers to the incidence of an aircraft with respect to its velocity vector. For aircraft to be able to fly safely at high angle-of-attack and perform maneuvers, the aircraft must be stable and controllable. In some modern aircraft, stability is provided by artificial means. Artificial stabilization may be achieved with control effectors, which are used to generate forces and moments to oppose unwanted aircraft motions. While artificial stabilization may be effective, it has some unfavorable side effects. For example, as the level of instability increases, the amount of control moment required to stabilize the vehicle increases. Beyond a certain level of instability, sufficient control moments may not be available, and the aircraft can experience a departure from controlled flight. Even if sufficient control authority is available to prevent unwanted motions, artificial stabilization results in less control power available to maneuver the aircraft. A loss of available control power results in a loss in mission effectiveness. Artificial stabilization is not an option with most low cost aircraft since such aircraft do not have computers and control effector designs required to add artificial stability. It is noted that a loss in inherent vehicle stability occurs with virtually all aircraft at high angles-of-attack.

While stability in pitch axis can be altered with careful design and control of aircraft center-of-gravity, directional stability must be provided by stabilizing surfaces or by artificial means. Directional stability is defined as the tendency of an aircraft to weathercock into the wind when disturbed. When used without reference to an axis system, directional stability is assumed to be in the flight path or stability axis system. Although other axis systems may be used for convenience, the flight path or stability axis reflects the motion of the aircraft. Flight path directional stability is composed of two parameters, i.e. body axis directional stability and body axis lateral stability or dihedral effect. The body axes of a vehicle are mutually perpendicular and are normally aligned along the fuselage axis, the approximate plane of the wing, and normal to the other two. Body axis directional stability refers to the tendency of the fuselage to point back into the wind when disturbed from equilibrium. Body axis lateral stability refers to a tendency for the aircraft to roll in a direction to eliminate any side component of the relative wind. If an aircraft is at an angle-of-attack other than zero, flight path axis directional stability is a combination of both body axis directional and lateral stability and is calculated from equation 1 as follows:

$$Cn\beta_{Stab} = Cn\beta * \cos(\alpha) - Cl\beta * \sin(\alpha) \qquad (1)$$

where:

$Cn\beta_{Stab}$ = Flight path axis directional stability
$\alpha$ = angle of attack
$Cn\beta$ = Body axis directional stability
$Cl\beta$ = Body axis lateral stability From equation 1 it is apparent that both body axis directional stability and body axis lateral stability contribute significantly to flight path directional stability when angle-of-attack is large. This implies that aircraft stability can be improved by any device or component that increases either or both values. It is highly desirable to provide inherent directional stability to maximize the amount of control power available to perform out of plane maneuvers, such as rolling, and to prevent rapid aircraft departures from controlled flight, which often lead to spins. Current and prior design practice has relied on large fixed aerodynamic surfaces mounted on the aircraft fuselage to stabilize the aircraft. However, such surfaces lose their effectiveness at large incidence angles.

The current invention relies on a novel arrangement of wing and tail surfaces to provide inherent directional stability even at high angle-of-attack. The invention achieves these results by joining the wing and horizontal tail panels with canted or vertical stabilizing surfaces that operate effectively over a wide angle-of-attack and sideslip range and provide stabilizing moments about both directional and lateral axes. These stabilizing moments will insure that the aircraft remains directionally stable, or nearly so, to much higher angles-of-attack than is current practice.

Directional stability has typically been provided by a single vertical tail located on the centerline of an aircraft at or near the rear of an aircraft fuselage. The vertical tail provides directional stability by acting as a lifting surface. When an aircraft is perturbed in a manner such that sideslip occurs, a local angle-of-attack occurs in the plane of the vertical tail. The local angle-of-attack generates a lifting force on the tail panel and creates a moment about the center-of-gravity of the aircraft that opposes the sideslip and returns the aircraft to a zero sideslip condition. The larger the tail surface area, the larger the moment that is generated, and the greater the directional stability.

Although the use of a vertical tail to provide directional stabilization has proven effective over the years, a vertical tail presents serious disadvantages at high angles-of-attack. As aircraft angle-of-attack increases, the fuselage of the aircraft tends to block airflow to the vertical tail. The blockage of airflow reduces the effectiveness of the vertical tail. If angle-of-attack exceeds a certain value, this value being dependent on the vehicle in question, the flow over the fuselage separates, or detaches. Under a detached flow condition, not only is the tail partially blocked by the fuselage, but flow separation results in a region of low energy air in the vicinity of the vertical tail, which further reduces the effectiveness of the tail.

An additional factor resulting in reduced effectiveness of the tail is the aft sweep of a typically configured tail. High performance aircraft typically employ swept wing and tail surfaces to reduce drag at transonic and supersonic Mach numbers. Due to structural considerations, these surfaces, including the vertical tail panel, are usually swept aft. For a vertical tail, aft sweep results in much of the airflow at high angles-of-attack being directed along the span of the surface of the tail rather than along the chord line of the tail, which further reduces effectiveness of the tail.

A single, centerline vertical tail has additional disadvantages for modern high performance aircraft. Highly swept surfaces at the front of typical modern high performance aircraft are intended to generate vortices, or regions of high energy rotational flow, at high angles-of-attack. These vortices have been shown to interact with downstream aircraft components, sometimes in an unfavorable manner. Using the F-16 aircraft as an example, under certain conditions, the vertical tail actually contributes a destabilizing directional moment.

Several modern high performance fighter aircraft employ twin vertical tails to partially overcome the disadvantages of a single tail surface. For a given aircraft configuration, the total area of the twin panels is usually more than a single panel configured to provide equivalent directional stability at low angles-of-attack. In all known current applications, the twin vertical tails are mounted on the fuselage. Therefore, at high angle-of-attack, the fuselage still tends to block a portion of airflow to the tail surfaces. Additionally, energy of the flow in the vicinity of the tail surfaces is reduced. On aircraft configurations set up to generate strong vortex flow fields, twin tail surfaces can reduce but not eliminate the effect of unfavorable interference due to vortex impingement and interaction. An additional problem encountered by fuselage mounted twin vertical tail configurations is the loss of effectiveness due to sweep back.

Other arrangements have been proposed or used to provide inherent directional stability, but most of these are intended for low performance aircraft operating at low angle-of-attack. Examples of other arrangements include twin horizontal stabilizer mounted vertical surfaces (e.g., the B-24 bomber of World War II), boom mounted tails (e.g., the P-38 fighter aircraft), and a wing tip mounted vertical tail (e.g., the Beechcraft Starship and numerous light plane designs). All of these concepts attempt to improve upon conventional means of stabilization. None are entirely successful. A new approach is required to provide directional stability at high angles-of-attack.

Historical results have shown that aerodynamic advantages exist for the biplane configuration. A biplane consists of two lifting surfaces or panels separated in height and sometimes longitudinal location. Test results have shown that the effective aspect ratio of a biplane is higher than that of a monoplane of the same span. The change in effective aspect ratio has been shown to be a function of main surface wing span, vertical distance between the lifting surface panels, ratio of the span of one panel to that of the other, and relative lengthwise positioning of the two panels, i.e., stagger.

Attempts have been made in modern designs to make use of the benefits of the biplane. Such attempts have largely consisted of designs that join together tips of forward and aft lifting surfaces. These attempts have generally not been successful for a number of reasons. First, the direct joining of the tips of two lifting surfaces results in no vertical separation between the panels at the tips. Test results indicate that a condition of no vertical separation between lifting surfaces eliminates the desired biplane effect. Second, joining of the lifting surfaces limits design options. For example, if the tips of the lifting surfaces are joined, it is usually necessary for both lifting surfaces to have the same span, which results in a tandem wing configuration that is not ideal for all applications.

An additional attempt to make use of the benefits of a biplane is a boxplane configuration. A boxplane configuration joins upper and lower wing panels in a rigid structure. However, a box plane arrangement uses a conventional horizontal stabilizer and does not attempt to use the joining members as vertical stabilizers. Other modern designs have attempted to use a biplane arrangement for supersonic vehicles. These designs may take advantage of favorable shock wave interaction at supersonic Mach numbers. Due to the nature of shock waves and their inclination with respect to an aircraft's direction of motion, a supersonic biplane arrangement is not suitable for a conventional wing and tail arrangement where the separation of wing and tail surfaces is set by considerations of aircraft balance and control capability rather than simply being determined by shock wave inclination at a design Mach number.

SUMMARY OF THE INVENTION

Consequently, one object of this invention is to improve on the prior art of providing directional stability at high angles-of-attack for flight vehicles. This goal is achieved by a unique arrangement of aircraft components including the wing, horizontal stabilizers, and vertical stabilizers. In addition to greatly improving high angle-of-attack directional stability, application of this invention results in a flight vehicle configured as and behaving in a manner similar to that of a biplane, thereby increasing the effective aspect ratio of the wing and reducing the induced drag of the aircraft.

A further advantage of this invention is that by joining all major lifting surfaces into one unit, an aircraft structure can be made stiffer for a given aircraft weight. Conversely, the weight of an aircraft can be reduced for a given stiffness.

A further object of this invention is to provide for a component arrangement that enables the vehicle to behave aerodynamically in the manner of a biplane, with an increase in effective aspect ratio of the wing and a corresponding reduction of the drag due to lift of the configuration.

In a preferred embodiment, the primary lifting surface, or wing, is located in a conventional position ahead of a horizontal tail and is mounted in a high position on the fuselage, that is, near the top of the fuselage. The horizontal tail surfaces, or horizontal stabilizers, are mounted behind the wing near the rear of the aircraft. The horizontal stabilizers are mounted in a low position on the fuselage, i.e., near the fuselage bottom. The directionally stabilizing surfaces consist of two aerodynamically configured panels joining the tips of the wing and horizontal stabilizer on each side of the aircraft. For simplicity and for historical reasons, the panels that join the tips of the wings and horizontal stabilizers will be referred to throughout this disclosure as vertical stabilizers although they may be also considered directional stabilizers. It is noted, however, that the orientation of the vertical stabilizers is not necessarily vertical, but may be canted out at the top. The arrangement of wing, horizontal stabilizers, and vertical stabilizers therefore forms a closed box structure. The required vertical separation between the wing and horizontal stabilizer causes the vehicle to behave in a manner of a biplane, with benefits as described above. The closed box configuration additionally produces a stiffer structure than a typical arrangement of aircraft components where the wing, horizontal stabilizer, and vertical stabilizer(s) are cantilevered out in space.

The preferred arrangement of this invention is a wing having a span equal to or greater than the span of a horizontal stabilizer. Such an arrangement forces the vertical joiner panels or vertical stabilizers to be either perpendicular to the approximate plane of the wing or canted out at the top. Since the wing is ahead of the horizontal tail, the vertical stabilizers joining the wing and tail are inclined to produce a forward aerodynamic sweep. Note that such an arrangement is in contrast to a typical arrangement for high speed vehicles where the sweep of lifting surfaces is traditionally in the aft direction.

In practice, the unique configuration of applicant's invention results in desirable flight characteristics. When an aircraft utilizing applicant's invention encounters a disturbance such as side slip, or a sideways velocity component at low angle-of-attack, incidence to the airflow develops on each panel of the vertical stabilizers. This incidence can be transformed to an angle-of-attack on a vertical stabilizer approximately equal to the sideslip angle times the sine of the dihedral angle of the vertical stabilizer. Dihedral angle is defined as the angle between the reference plane of the aircraft and a plane along the span of the vertical stabilizer. The sideslip perturbation results in an incremental force being generated normal to the plane of each vertical stabilizer. The incremental force is in addition to any side-to-side symmetric force which would occur on the panel during normal operation without sideslip. Since the center of pressure of the incremental force due to sideslip lies behind the center of rotation or center-of-gravity of the aircraft, the net effect is to produce a moment on the aircraft which tries to reduce the sideslip and roll the vehicle away from the sideslip. The first effect of reduction of sideslip is known as "body axis directional stability". The second effect is known as "body axis lateral stability". The net effect of the vertical stabilizers is to stabilize the aircraft in sideslip as desired.

If angle-of-attack is not zero, then both body axis directional stability and body axis lateral stability contribute to flight path directional stability. For the present invention, the moment components generated by the vertical stabilizers provide stabilizing moments about both axes. If the vertical stabilizer panels are indeed vertical (i.e., approximately perpendicular to the plane of the wing), then a directionally stabilizing moment is generated but not a laterally stabilizing moment.

The improvement provided by this invention is its effect at high angles-of-attack where a conventional vertical tail loses its effectiveness. In an embodiment of the invention where the vertical surfaces are canted outboard, the total forces on the panel will typically act upwards in a symmetric condition, i.e. when no sideslip is present. The incremental force introduced on each panel tends to stabilize the aircraft both directionally and laterally.

Several differences are apparent between the two wing mounted vertical surfaces and the single centerline vertical tail found on conventionally configured aircraft. First, in the two wing mounted vertical surfaces embodiment, the fuselage tends to block air flow to the downwind vertical stabilizer panel. While the incremental force on the downwind panel is still stabilizing, the total force acting normal to the surface of the downwind panel attempts to rotate the aircraft in the wrong or destabilizing direction if the downwind panel has geometric dihedral and carries an aerodynamic upload. However, the upwind panel provides a stabilizing moment, both from the basic force carried on the panel at high angles-of-attack as well as the incremental force due to sideslip. Therefore, any blockage of the downwind panel due to the presence of the fuselage actually results in an improvement in directional stability, since the effect of the destabilizing moment is reduced.

The upwind vertical stabilizer panel operates in undisturbed air away from the influence of the fuselage. The capability of operating in undisturbed air contrasts with conventional single or multiple vertical stabilizer panels mounted on the fuselage. For conventional arrangements, blockage renders vertical stabilizers ineffective at high angles-of-attack resulting in a loss of directional stability. In the current invention, the aerodynamic surface that provides directionally stabilizing moments (i.e., the upwind stabilizer panel) is well away is from the fuselage in a region of relatively undisturbed air and can continue to be effective at virtually any angle-of-attack.

Second, the arrangement of components of this invention requires that the wing be located in a position higher than and forward of the horizontal stabilizer. Consequently, the vertical stabilizers must be swept forward aerodynamically. As angle-of-attack increases, a component of flow velocity normal to the leading edge increases for the vertical stabilizers of this invention. This increases the aerodynamic effectiveness of the surfaces. The increase in aerodynamic effectiveness due to the forward sweep of the vertical surfaces contrasts with the result of the more typical unswept or aft swept vertical stabilizing surfaces employed on other aircraft where an increased angle-of-attack results in more of a local velocity component being directed along the span of the vertical surface, resulting in a loss in aerodynamic efficiency.

Preferably, the vertical stabilizers have a straight leading edge extending from a leading edge of the wing to a leading edge of one of the horizontal stabilizers. Additionally, each of the vertical stabilizers have a straight trailing edge extending from a trailing edge of the wing to the trailing edge of the horizontal stabilizers. The vertical stabilizers also preferably have a chord that is substantially constant from a lower end to an upper end.

It is envisioned that the implementation of this invention in the design of a particular flight vehicle would be tailored to the overall design requirements, the operating angle-of-attack range desired, and other factors. This invention can be applied to any flight vehicle, aircraft or missile. It is appropriate for everything from a high performance, supersonic fighter aircraft to low speed vehicles powered by piston or turboprop engines driven by a propeller.

Other and further features and objects of the invention will be more apparent to those skilled in the art upon a consideration of the appended drawings and the following description wherein several typical installations are shown and one constructional form of apparatus for carrying out the invention are disclosed. This invention consists of the construction, combination, and arrangement of parts all as in hereinafter more fully described, claimed, and illustrated in the accompanying drawings.

DETAILED DESCRIPTION OF THE INVENTION

Figure 1:
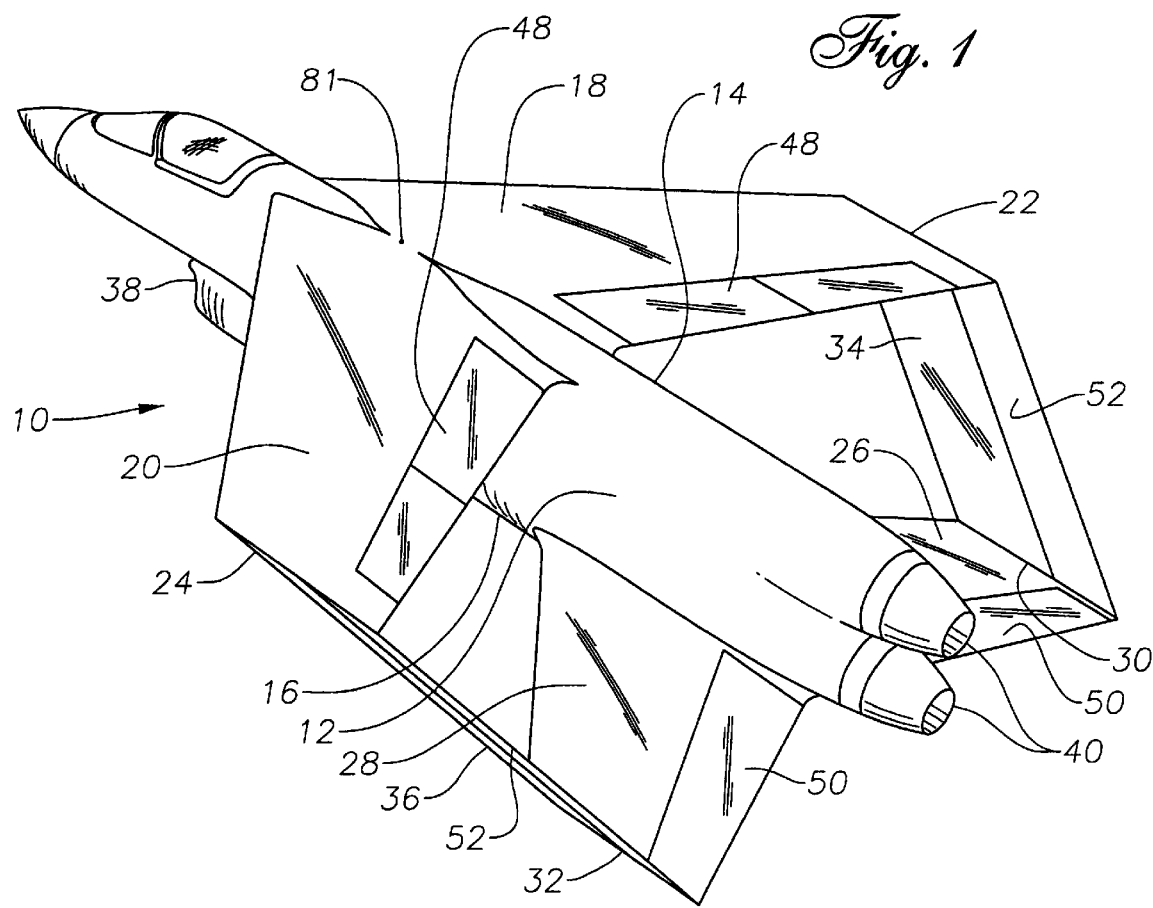
FIG. 1 is a perspective view of an aircraft having a structure wherein the fuselage, wing, horizontal stabilizers and vertical stabilizers are arranged in accordance with the invention.

Referring now to FIG. 1, shown is an aircraft designated generally 10. The components of aircraft 10 include fuselage 12 having a top 14 and a bottom 16, and right wing 18 and left wing 20, which are affixed to fuselage 12. Right wing 18 has right wing tip 22. Left wing 20 has left wing tip 24. Proximate fuselage bottom 16, are right horizontal stabilizer 26 and left horizontal stabilizer 28, which are affixed to fuselage 12. Right horizontal stabilizer 26 has right horizontal stabilizer tip 30 and left horizontal stabilizer 28 has left horizontal stabilizer tip 32. Spanning between right wing tip 22 and right horizontal stabilizer tip 30 is right vertical stabilizer 34. Spanning between left wing tip 24 and left horizontal stabilizer tip 32 is left vertical stabilizer 36.

In this embodiment, inlet 38 feeds two rear mounted engines which exhaust through nozzles 40. Vertical stacking of the engines results in vertical separation 42 of wings 18 and 20 with respect to horizontal stabilizers 26 and 28, which can be seen most clearly in FIG. 2.

Figure 2:
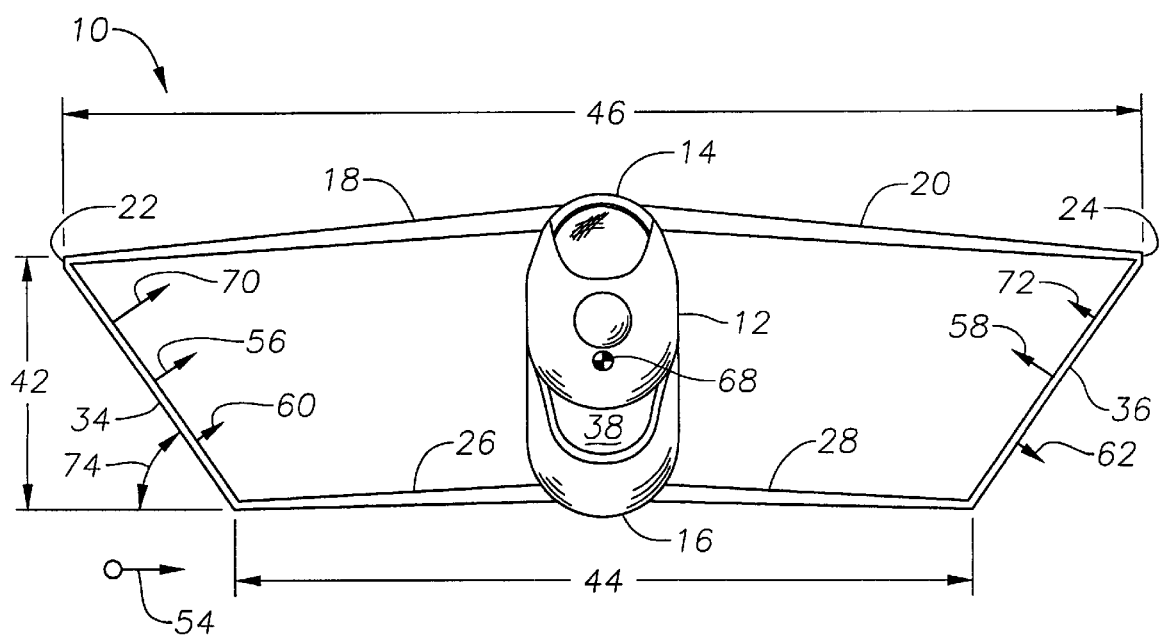
FIG. 2 is a front view of the wing, horizontal stabilizers and vertical stabilizers arranged in accordance with the invention.

Referring now to FIG. 2, horizontal stabilizer span 44 is approximately seventy percent of wing span 46. Therefore, vertical stabilizers 34 and 36 are canted outward toward the top as can be more clearly seen in FIG. 2.

Referring back to FIG. 1, wings 18 and 22 use typical trailing edge devices 48 such as outboard ailerons and inboard trailing edge flaps. The embodiment of the invention shown in FIG. 1 is an example of a subsonic trainer aircraft. Therefore, elevators 50 are used on the trailing edges of horizontal stabilizers 26 and 28. Each trailing edge of horizontal stabilizers 26, 28 has an inboard junction at fuselage 16 and an outboard junction at the tip of each horizontal stabilizer 26, 28. As shown in the drawings, the inboard junction is no further aft than the outboard junction. In the drawings, the outboard junction of the trailing edge of each horizontal stabilizer 26, 28 is farther aft than the inboard junction. For supersonic application, all moving horizontal stabilizers may be desirable. Movable rudders 52 are located on the trailing edges of vertical stabilizers 34 and 36 to provide control about the yaw axis.

Referring back to FIG. 2, a front view of aircraft 10 is shown. The direction of relative wind is designated by relative wind component vector 54. For a condition of no side slip velocity, relative wind component vector 54 is zero. In a condition of no side slip, right vertical stabilizer 34 and left vertical stabilizer 36 may carry a small load as indicated by right vertical stabilizer load vector 56 and left vertical stabilizer load vector 58. In the presence of a side velocity that produces a side slip angle, an incidence angle is produced on right vertical stabilizer 34 and left vertical stabilizer 36 that generates right vertical stabilizer incremental force 60 and left vertical stabilizer incremental force 62. Incremental forces 60 and 62 produce a moment or twisting reaction about directional axis 64 and lateral axis 66, which may be more easily seen in FIG. 3. Center of gravity 68 is the reference point for the moments. Forces acting on right vertical stabilizer 34 and left vertical stabilizer 36 act behind center of gravity 68 since vertical stabilizers 34 and 36 are located towards the rear of the vehicle. Therefore, the resulting moment about directional axis 64 is in a direction that will try to point aircraft 10 into the side velocity, i.e. reduce the side slip angle. This is known as directional stability, thus vertical stabilizers 34, 36 may be referred to as directional stabilizers. The resulting moment about lateral axis 66 tends to rotate wings 18 and 22 such that the downwind wing moves downward. This is referred to as lateral stability.

Referring back to FIG. 2, right net normal force 70 is the total force acting on right vertical stabilizer 34. Left net normal force 72 is the total force acting on left vertical stabilizer 36. Net normal forces 70 and 72 are the total forces acting on vertical stabilizers 34 and 36 due to the incidence of the aircraft and the side slip angle. Since a downwind panel may be partially blocked by fuselage 12, any loss in efficiency of the downwind surface is actually beneficial to the directional stability of aircraft 10.

To provide some of the induced benefits of a biplane configuration and to insure adequate surface area of vertical stabilizers 34 and 36, the ratio of vertical separation distance 42 to wing span 46 cannot be too small. A minimum value of 0.15 is recommended. In the preferred embodiment, the ratio of vertical separation distance to wing span ranges from values of 0.2 to 0.25. Although there is no upper limit on the height to span ratio, design considerations will typically limit the height to span ratio to no more than 0.5 to 0.6. Additionally, although both wings 18 and 22 and horizontal stabilizers 26 and 28 are shown flat, i.e. without geometric dihedral, such dihedral (gull wing up or down) in either surface is permissible. If wings 18 and 22 or horizontal stabilizers 26 and 28 possess geometric dihedral, then vertical separation 42 should be defined by the average vertical distance between wings 18 and 22 and horizontal stabilizers 26 and 28. Note that changes in the values of the height span parameter also impact the inclination of vertical stabilizers 34 and 36.

In FIG. 2, geometric dihedral angle 74 is approximately 52 degrees. However, geometric dihedral angle 74 may be 90 degrees wherein vertical stabilizers 34 and 36 are vertical. Preferably, geometric dihedral angle 74 should range from 45 to 90 degrees. Preferably, vertical stabilizers 34 and 36 should be vertical or canted outboard as shown. An inboard cant is not preferred since an inboard cant of vertical stabilizers 34 and 36 results in a generation of a destabilizing lateral moment with side slip. When right vertical stabilizer 34 and left vertical stabilizer 36 are positioned vertically, i.e. where geometric dihedral angle 74 is 90 degrees, little or no lateral moment will be generated. When geometric dihedral angle 74 is 45 degrees, horizontal stabilizer span 44 is one half of wing span 46.

Figure 3:
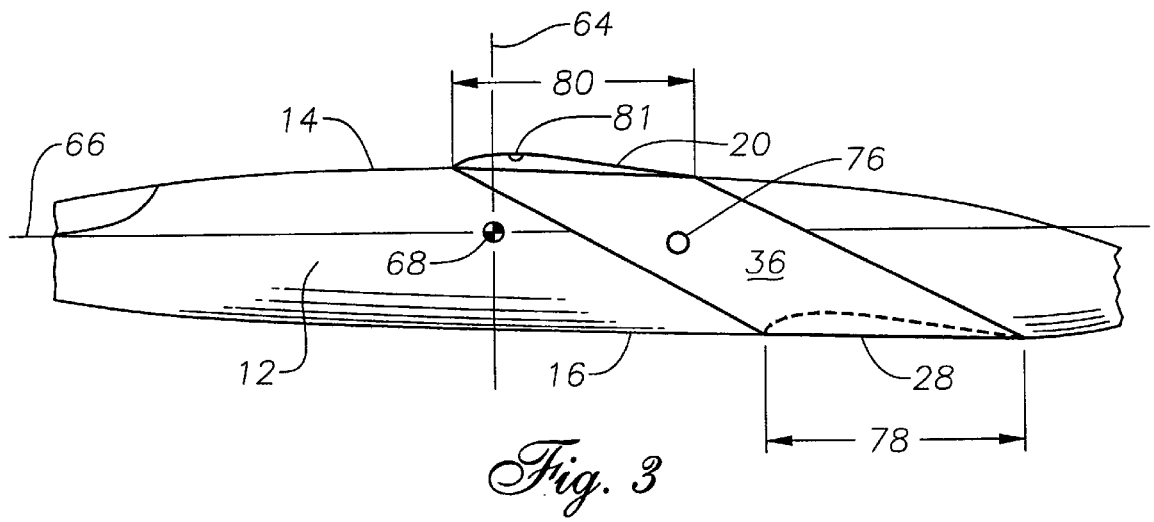
FIG. 3 is a side view of an aircraft having an arrangement of fuselage, wing, horizontal stabilizers and vertical stabilizers in accordance with the invention.

Referring now to FIG. 3, shown is a side view of aircraft 10. Left wing 20 is shown positioned proximate fuselage top 14. Left horizontal stabilizer 28 is shown positioned proximate fuselage bottom 16 and rearward of left wing 20. Aerodynamic center or center of lift 76 of left vertical stabilizer panel 36 is shown positioned behind center of gravity 68 of aircraft 10. By positioning center of lift 76 behind center of gravity 68, incremental forces on left vertical stabilizer 36 due to side slip will create a stabilizing directional moment.

The ratio of horizontal stabilizer tip cord 78 to wing tip cord 80 should be equal to or greater than one. By providing a horizontal stabilizer tip cord to wing tip cord ratio of greater than one, forces acting on vertical stabilizer 36 will stabilize rather than destabilize aircraft 10. However, in an extreme case where both wing 20 and horizontal stabilizer 36 are mounted well aft such that aerodynamic center 81 of wing 20 is near or behind center of gravity 68 of the aircraft, this geometric requirement can be waived. It has been found that it is important to keep forces generated on vertical stabilizers 34 and 36 behind center of gravity 68 of aircraft 10.

Figure 4:
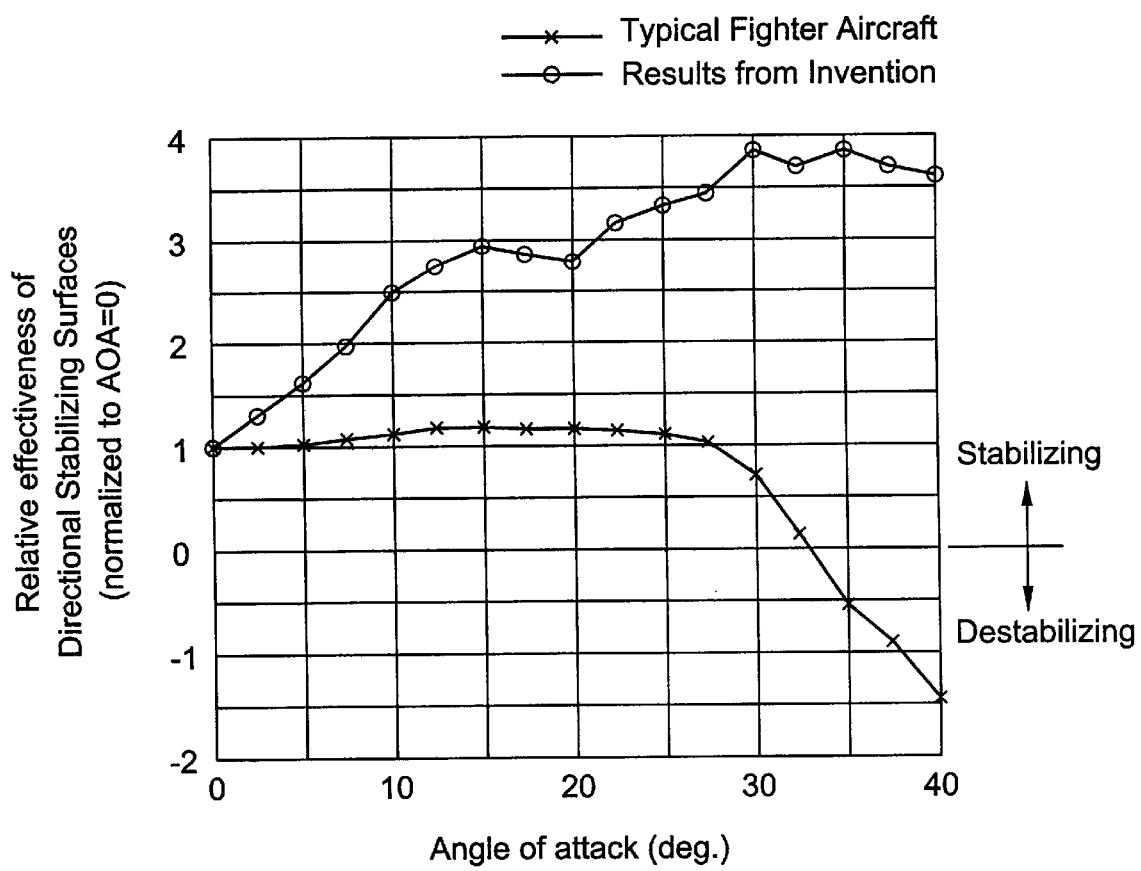
FIG. 4 is a graphical representation of the relative effectiveness of the vertical stabilizers of this invention compared to the stabilizing surface of a conventional single centerline vertical tail.

Referring now to FIG. 4, a graphical representation of the effectiveness of a conventional center line vertical tail for providing directional stability is compared to the effectiveness of providing directional stability by means of twin vertical stabilizer panels of the present invention. Flight path axis directional stability is plotted on the y-axis versus angle-of-attack, which is plotted on the x-axis. It can be seen from the graph that the effectiveness of the conventional surface drops rapidly at angles-of-attack greater than 25 degrees. Above 35 degrees, the vertical stabilizer actually destabilizes the vehicle. The data for the proposed invention show that wing mounted vertical stabilizers 34 and 36 of the invention become more effective as angle-of-attack increases and remain effective to the highest angle-of-attack shown in the data. The results shown are normalized to the value of stabilizing moment produced by each configuration at zero degrees angle-of-attack. The absolute value is different between the two configurations because of differences in surface size and geometry.

The vertical stabilizers act to provide directional stability along the flight path and are much more effective at high angles-of-attack than conventional single or multiple vertical stabilizers. This arrangement of the invention achieves these results by providing vertical stabilizers that are less strongly influenced by fuselage blockage at high angles-of-attack and providing a component geometry in which the effects of fuselage blockage actually improve the overall effectiveness of the vertical stabilizers instead of decreasing the effectiveness of the vertical stabilizers. Additionally, stabilizing moments are provided in both the body axis directional and lateral axes, both of which contribute to flight path axis directional stability at high angles-of-attack. Finally, by providing vertical stabilizers having a forward sweep, wherein the forward sweep increases a component of flow velocity normal to the leading edge of the vertical stabilizer, the aerodynamic efficiency of the vertical stabilizers improves as angle-of-attack increases.

The invention provides directional stability by passive means without control augmentation and is suitable for application to new designs of any performance level ranging from slow speed, highly maneuverable aerobatic aircraft to supersonic fighters.

The vertical separation between the wing and horizontal tail and the joining of the same by the vertical stabilizers produces some effects of a biplane with reductions in induced drag. Additionally, the closed structure may also be made structurally more efficient than a conventional structure having cantilevered lifting surfaces. Although only the preferred embodiment of arrangements for carrying out this invention have been described above, it is not to be construed that the invention is limited to such embodiments. Other modifications may be made by those skilled in the art without departing from the spirit and scope of the invention defined below. No attempt has been made to incorporate any other such modifications or forms in this disclosure in the interests of clarity.

What is claimed is:

1. An aircraft structure to improve directional stability comprising:

a fuselage;

a wing mounted to said fuselage;

a horizontal stabilizer mounted to a bottom of said fuselage, rearward of and at a lower level than said wing, said horizontal stabilizer having trailing edges on opposite side of said fuselage, each trailing edge having an outboard junction with a tip of said horizontal stabilizer and an inboard junction with said fuselage, wherein said horizontal stabilizer sweeps backward;

a forwardly sweeping right directional stabilizer spanning between said wing and said horizontal stabilizer on a right side of said fuselage and canted outboardly and having a movable control surface on a trailing edge of said right vertical stabilizer; and a forwardly sweeping left directional stabilizer spanning between said wing and said horizontal stabilizer on a left side of said fuselage and canted outboardly and having a movable control surface on a trailing edge of said left directional stabilizer.

2. An aircraft structure according to claim 1 wherein each of said directional stabilizers has a straight leading edge extending from a leading edge of the wing to a leading edge of one of the horizontal stabilizers, and each of the vertical stabilizers has a straight trailing edge extending from a trailing edge of the wing to a trailing edge of one of the horizontal stabilizers.

3. An aircraft structure according to claim 1 wherein said right directional stabilizer and said left directional stabilizer are at a dihedral angle in a range from 45 degrees to 90 degrees.

4. An aircraft structure according to claim 1 wherein said wing has a greater span than said horizontal stabilizer; and said right directional stabilizer and said left directional stabilizer are canted outboard at a dihedral angle at least 45 degrees.

5. An aircraft structure according to claim 1 wherein said right horizontal stabilizer has a tip chord which is approximately equal to or greater than a tip chord of said right wing tip and said left horizontal stabilizer has a tip chord which is approximately equal to or greater than a tip chord of said left wing tip.

6. An aircraft structure according to claim 1 wherein:

said wing has a wing span; and said aircraft structure further comprises a vertical separation between said wing and said horizontal stabilizer, wherein a ratio of said vertical separation to said wing span is at least 0.15.

7. An aircraft according to claim 1 wherein:

said wing has a wing span; and said aircraft structure further comprises a vertical separation between said wing and said horizontal stabilizer, wherein a ratio of said vertical separation to said wing span is between approximately 0.15 and approximately 0.6.

8. An aircraft according to claim 1 wherein:

said horizontal stabilizer has a right tip and a left tip;

said right directional stabilizer is positioned proximate said right tip of said horizontal stabilizer; and said left directional stabilizer is positioned proximate said left tip of said horizontal stabilizer.

9. An aircraft according to claim 1 wherein said wing is at a top of said fuselage.

10. An aircraft according to claim 1 wherein a center of lift of the vertical stabilizers is located aft of a center of gravity of the aircraft.

11. The aircraft structure according to claim 1, where said wing and said horizontal stabilizer are substantially parallel to each other.

12. The aircraft structure according to claim 1, where said outboard junction is aft of said inboard junction, defining a rearward sweep for said horizontal stabilizer.

13. An aircraft structure to improve directional stability comprising:

a fuselage;

a right wing affixed to said fuselage proximate said top of said fuselage, said right wing having a tip and a tip chord;

a left wing affixed to said fuselage proximate said top of said fuselage, said left wing having a tip and a tip chord;

a right horizontal stabilizer affixed to said fuselage proximate said bottom of said fuselage and rearward of said right wing, said right horizontal stabilizer having a tip and a tip chord, said right horizontal stabilizer sweeps backward;

a left horizontal stabilizer affixed to said fuselage proximate said bottom of said fuselage and rearward of said left wing, said left horizontal stabilizer having a tip and a tip chord, wherein a wing span from the tip of the right wing to the tip of the left wing is greater than a horizontal stabilizer span from the tip of the right horizontal stabilizer to the tip of the left horizontal stabilizer, said left horizontal stabilizer sweeps backward;

a right directional stabilizer spanning between the tip of said right wing and the tip of said right horizontal stabilizer and canted outboardly, said right directional stabilizer having a forward sweep and a movable control surface on a trailing edge of said right directional stabilizer; and a left directional stabilizer spanning between the tip of said left wing and the tip of said left horizontal stabilizer and canted outboardly, said left directional stabilizer having a forward sweep and a movable control surface on a trailing edge of said left directional stabilizer.

14. An aircraft structure according to claim 13 wherein said right directional stabilizer and said left directional stabilizer are canted outboard at a dihedral angle at least 45 degrees.

15. An aircraft structure according to claim 13 wherein each of said right directional stabilizer and said left directional stabilizer each has a chord which is substantially constant from a lower end to an upper end.

16. An aircraft structure according to claim 13 wherein said right horizontal stabilizer tip chord is approximately equal to or greater than said right wing tip chord and wherein said left horizontal stabilizer tip chord is approximately equal to or greater than said left wing tip chord.

17. An aircraft structure according to claim 13 wherein:

said right wing and said left wing comprise a wing span;

said right wing and said right horizontal stabilizer have a vertical separation; and said left wing and said left horizontal stabilizer have a vertical separation wherein a ratio of said vertical separation to said wing span is in the range from approximately 0.15 and approximately 0.6.

18. The aircraft structure according to claim 13, wherein said right wing and right horizontal stabilizers are substantially parallel to each other, and wherein said left wing and left horizontal stabilizer are substantially parallel to each other.

19. The aircraft structure according to claim 13, wherein said outboard junctions are aft if said inboard junctions.

20. An aircraft structure to improve directional stability comprising:

a fuselage;

a right wing affixed to said fuselage proximate said top of said fuselage, said right wing having a tip and a tip chord;

a left wing affixed to said fuselage proximate said top of said fuselage, said left wing having a tip and a tip chord;

a right horizontal stabilizer affixed to said fuselage proximate said bottom of said fuselage and rearward of said right wing, said right horizontal stabilizer having a tip and a tip chord, wherein said right horizontal stabilizer tip chord is approximately equal to or greater than said right wing tip chord, said right horizontal stabilizer sweeps backward;

a left horizontal stabilizer affixed to said fuselage proximate said bottom of said fuselage and rearward of said left wing, said left horizontal stabilizer having a tip and a tip chord wherein said left horizontal stabilizer tip chord is approximately equal to or greater than said left wing tip chord, wherein a wing span from the tip of the right wing to the tip of the left wing is greater than a horizontal stabilizer span from the tip of the right horizontal stabilizer to the tip of the left horizontal stabilizer, said left horizontal stabilizer sweeps backward;

a right directional stabilizer spanning between the tip of said right wing and the tip of said right horizontal stabilizer, said right directional stabilizer having a forward sweep and being canted outboard from said right horizontal stabilizer to said right wing at a dihedral angle of at least 45 degrees;

a left directional stabilizer spanning between the tip of said left wing and the tip of said left horizontal stabilizer, said left directional stabilizer having a forward sweep and being canted outboard from said left horizontal stabilizer to said left wing at a dihedral angle of at least 45 degrees;

movable control surfaces on trailing edges of said right and left directional stabilizers;

wherein said right wing and said right horizontal stabilizer have a vertical separation, and said left wing and said left horizontal stabilizer have a vertical separation wherein a ratio of said vertical separations to said wing span is in the range from approximately 0.15 to approximately 0.6.

21. The aircraft structure according to claim 20, wherein said right wing and said right horizontal stabilizer are substantially parallel to each other and wherein said left wing and left horizontal stabilizer are substantially parallel to each other.

22. The aircraft structure according to claim 20, wherein said outboard junctions are aft of said inboard junctions.

* * * * *